(12) United States Patent
Heidelberger

(10) Patent No.: US 9,096,030 B2
(45) Date of Patent: Aug. 4, 2015

(54) SEALING AND CUTTING UNIT

(75) Inventor: Peter Heidelberger, Kempten (DE)

(73) Assignees: Peter Heidelberger, Kempten (DE); Kurt Hoerburger, Waltenhofen (DE)

( * ) Notice: Subject to any disclaimer, the term of this patent is extended or adjusted under 35 U.S.C. 154(b) by 434 days.

(21) Appl. No.: 13/101,899

(22) Filed: May 5, 2011

(65) Prior Publication Data
US 2012/0202668 A1    Aug. 9, 2012

(30) Foreign Application Priority Data
May 5, 2010    (DE) .......................... 10 2010 019 601

(51) Int. Cl.
B32B 38/00 (2006.01)
B31B 1/00 (2006.01)
B29C 65/22 (2006.01)
B29C 65/74 (2006.01)
B29C 65/00 (2006.01)

(52) U.S. Cl.
CPC ................. *B31B 1/00* (2013.01); *B29C 65/222* (2013.01); *B29C 65/7441* (2013.01); *B29C 66/0044* (2013.01); *B29C 66/81427* (2013.01); *B29C 66/81431* (2013.01); *B29C 66/81811* (2013.01); *B29C 66/81821* (2013.01); *B29C 66/8242* (2013.01); *B29C 66/8322* (2013.01); *B29C 66/8511* (2013.01); *B29C 66/8122* (2013.01); *B29C 66/8167* (2013.01); *B29C 66/81423* (2013.01); *B31B 2219/145* (2013.01); *B31B 2219/6038* (2013.01); *B31B 2221/60* (2013.01); *B32B 38/0004* (2013.01)

(58) Field of Classification Search
CPC   B29C 65/22; B29C 65/7441; B29C 66/0044; B29C 66/81821; B29C 66/8242; B29C 66/8322; B29C 66/8511; B29C 65/222; B29C 66/81431; B29C 66/81427; B32B 38/0004
USPC ................. 156/510, 515, 583.1, 583.2, 583.3
See application file for complete search history.

(56) References Cited

U.S. PATENT DOCUMENTS

| 2,824,596 | A | * | 2/1958 | Crawford, Jr. | ................. | 156/515 |
| 3,925,958 | A | * | 12/1975 | Heisig | ................. | 53/425 |
| 4,093,500 | A | * | 6/1978 | Browne | ................. | 156/510 |
| 4,396,449 | A | * | 8/1983 | Tumminia | ................. | 156/251 |
| 4,630,429 | A | * | 12/1986 | Christine | ................. | 53/479 |
| 7,174,699 | B1 | * | 2/2007 | Wyman et al. | ................. | 53/547 |
| 2005/0139325 | A1 | * | 6/2005 | Bleckmann et al. | ................. | 156/510 |

* cited by examiner

Primary Examiner — Mark A Osele
Assistant Examiner — Christopher C Caillouet
(74) Attorney, Agent, or Firm — Boyle Fredrickson S.C.

(57) ABSTRACT

Disclosed is a sealing and cutting unit with a sealing device and a cutting device. The latter is assigned with hold-down means positioned downstream of the cutting device in the direction of transport of a film to be sealed and to be detached.

14 Claims, 4 Drawing Sheets

SEALING AND CUTTING UNIT

BACKGROUND OF THE INVENTION

Field of the Invention

The invention relates to a sealing and cutting unit for cutting film tubes or the like, in accordance with the preamble of claim 1.

Such sealing and cutting units are used to detach bags, for instance, for storing food, from a continuous film tube. In this process, the foil tubes are sealed along an edge by heat-sealing, and are detached from the film tube along this sealed region. The good to be accommodated, for instance, the meat, is then placed into the bag and subsequently heat-sealed by a further sealing process, wherein the film material is frequently designed such that it shrinks by means of heat application, for instance, in a water bath, and surrounds the inserted good closely.

DE 10 2006 030 119 A1 discloses such a sealing and cutting unit in which a film tube is heat-sealed by means of a sealing head integrated in a roll, and is simultaneously cut or perforated by a cutting tool that is also integrated in this roll.

With this solution it is of disadvantage that the construction of such a roll comprising a heating head and a cutting device is very complex, and that moreover, in the case of damage, the entire roll with the sealing head and the cutting device has to be exchanged. Another disadvantage consists in that such a cylindrical roll is provided for the cutting of straight edges. In many cases, the bags detached from the film tube are, however, provided with curved edges so as to enable better adaptation to the good to be accommodated and to avoid empty corner regions in the filled state.

DE 698 18 263 T2 discloses a sealing and cutting unit by which it is possible to detach bags from a film tube and seal them. This device is designed with a cutting device and a clamping and sealing head, both of which are adapted to be lowered via a drive from a retraction position toward the film so as to seal a region and detach it adjacent to the sealing.

With this device, too, a disadvantage consists in that the sealing head and the cutting device are designed as a structural unit and thus have a very complex structure that aggravates the maintenance thereof.

A disadvantage common to both devices mentioned consists in that thermal problems may arise due to the integration of the sealing head or the sealing roll, respectively, and the cutting device. In order to avoid distortion or deformation of the film, the thermal energy required for heat-sealing should, however, be applied to a closely restricted region; the region to be cut, however, is to remain relatively cool in order to support the cutting process, on the one hand, and avoid distortion of the film, on the other hand. This requirement cannot be met with the conventional solutions in which the cutting device and the heat-sealing head are designed as an integral component, since in both solutions the heat-sealing head or the rolls provided with the heat sealing head, respectively, is/are used as hold-down means and hence introduce thermal energy into the cutting region.

Contrary to this, it is an object of the invention to provide a compact sealing and cutting unit with which high-quality sealing and detaching of a bag from a film tube is enabled.

This object is solved by a sealing and cutting unit with the features of claim 1.

Advantageous further developments of the invention are the subject matters of the subclaims.

In accordance with the invention, the sealing and cutting unit is designed with a sealing device for heat-sealing an edge portion of a film tube or the like, and with a cutting device for detaching a section, in particular a bag, along the edge portion, and with a drive for lowering the sealing device.

The unit further comprises a cutter bar with hold-down means positioned downstream of the cutting device when viewed in the direction of transport of the film tube, said hold-down means holding the film in the area of the transport plane thereof in the cutting position, wherein the cutting device is designed to be stationary.

This means that in this variant the film is held down by a suitable component integrated into a cutter bar, which is separated thermally from the sealing device in a comparatively simple manner, wherein the knife is designed vertical and is hence not displaced via the feed device, so that thermal interactions between the sealing device and the cutting device are also minimized.

Another advantage consists in that easy adaptation of the unit to differing bag geometries is enabled by easy exchanging of the hold-down means and an appropriate positioning of the vertical cutting device. It is also possible to exchange the entire cutter bar for adaptation to a geometry.

In one embodiment of the invention, the cutter bar is designed with a recess into which the cutting device immerses during detaching at least in sections, and which separates the hold-down means from a hold-down leg adjacent to the sealing device, the effective area of which is somewhat spaced apart from the transport plane in the cutting position. During cutting, the vertical cutting device then immerses into this recess, wherein a reliable positioning of the film tube is guaranteed by the hold-down means and the hold-down leg.

Preferably, the cutting device is designed with a vertical knife extending approximately through the transport plane in the direction of the cutter bar.

Advantageously, the sealing unit is designed with a sealing rail holding the cutter bar and a sealing element.

In a variant of the invention, the sealing element is held at a plastic bed, so that the thermal insulation with respect to the hold-down means and the cutting device is improved.

In the unit, respective Teflon formats may be provided in the region of the sealing rail at the sides of the transport path and of the sealing head, between which the film section extends. These Teflon formats that are easy to exchange avoid a direct contacting of the film with the sealing element or with strongly heated regions.

It is preferred that the Teflon format at the side of the sealing element extends up to the hold-down leg.

The thermal stress of the film is minimum if the sealing rail is cooled.)

The construction of the unit is particularly compact if the cutter bar is fixed detachably at the sealing rail.

The unit can be used in a particularly variable manner if it is assigned with a control unit for predetermining the bag length.

Depending on the type of bag, the cutter bar and the sealing device may be designed to be arcuate, straight, or of some other suitable geometry.

The device-technical effort for the cutting unit can be further minimized if the film tube is pulled off a core.

In one embodiment of the invention, the sealing unit is designed with an electrically contacted sealing wire that is covered by the Teflon format.

BRIEF DESCRIPTION OF THE DRAWINGS

A preferred embodiment of the invention will be explained in more detail in the following by means of schematic drawings. There show:

FIG. 1 illustrates in a strongly simplified diagrammed manner the basic structure of a sealing and cutting unit 1 in accordance with the invention, by which it is possible to cut bags 2 from a film tube 4, wherein the latter is, for instance, delivered as a core 6. In principle, however, such a unit 1 can also be used for cutting other sections from a film web.

Figure 1:
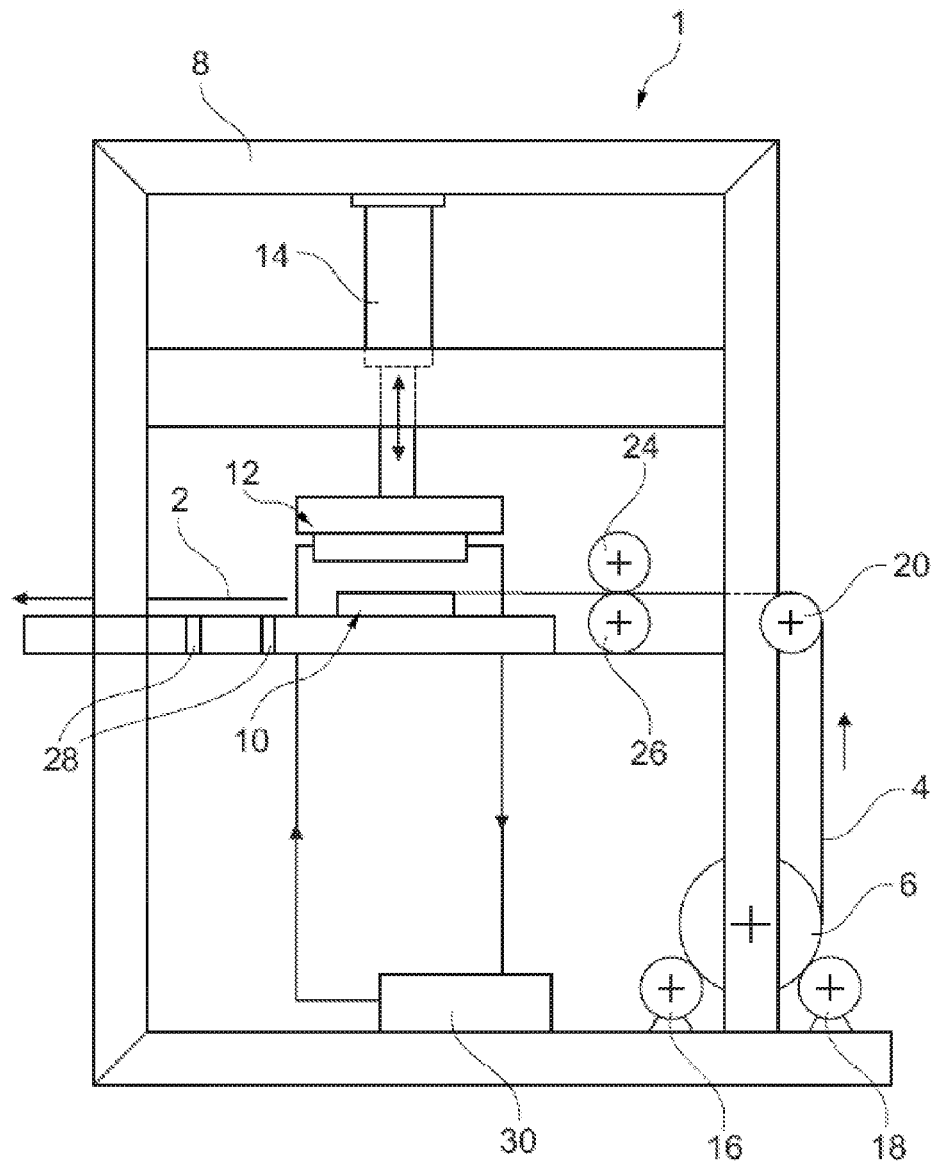
FIG. 1 a schematic representation of a sealing and cutting unit according to the invention.

The sealing and cutting unit 1—in the following briefly referred to as unit—comprises a frame 8 at which a cutting device 10 and a sealing device 12 are held. In the illustrated embodiment, the cutting device 10 is held stationary at the frame 8 while the sealing device 12 is adapted to be lowered by a suitable drive, for instance, a pneumatic cylinder 14, from a waiting position at a distance to the film tube 4 (FIG. 3) to a sealing position (FIG. 4). This stroke of the pneumatic cylinders 14 is illustrated with the vertical arrows in FIG. 1.

The core 6 is supported on two bearing rolls 16, 18, wherein the film web 4 initially extends in vertical direction to a deflection roll 20 and is then conducted to transport rolls 24, 26. At least one of these transport rolls 24, 26 is driven, so that a drive moment is transferred to the film tube by the surface pressure between the two rolls 24, 26, and the end portion thereof is pulled off the roll 6 and guided to the actual cutting/sealing station. This guiding is performed along guiding faces that are not illustrated in FIG. 1 for reasons of simplification.

The end portion of the film is then sealed by lowering of the sealing device 12, and cut along the heat-sealed joint by the cutting device 10. The detached bag 2 is then pulled off the device 1 in the direction of the arrow, wherein a flat resting of the film end portion or of the bag 2 is effected by impacting by means of negative pressure. This is, for instance, done by bores 28 connected to a suction pump.

To avoid a thermal overload of the bags 2, the sealing device 12 is provided with a cooling 30 via which a coolant, for instance, water is guided in a circular flow.

As initially explained, it is of advantage for some goods, for instance, for pieces of meat, if the cutting edge and the heat-sealed joint have the form of a circular arc, wherein this radius R may, depending on the breadth of the film tube, range, for instance, between 130 and 420 mm. The device 1 according to the invention is designed such that it is possible to process film tube breadths of up to 600 mm. It is to be understood that the device 1 may also be adapted to other film breadths.

In order to form such curved cutting edges, the effective areas of the cutting device 10 and of the sealing device 12 are designed with appropriate radii. In the case of straight cutting edges, the effective areas would then be designed to be straight and to run perpendicular in the drawing plane in FIG. 1.

The feed of the discontinuously driven transport rolls 24, 26 and hence the length of the bag may be adjusted at a control unit that is not illustrated, so that the unit 1 is very flexible to use.

Figure 2:
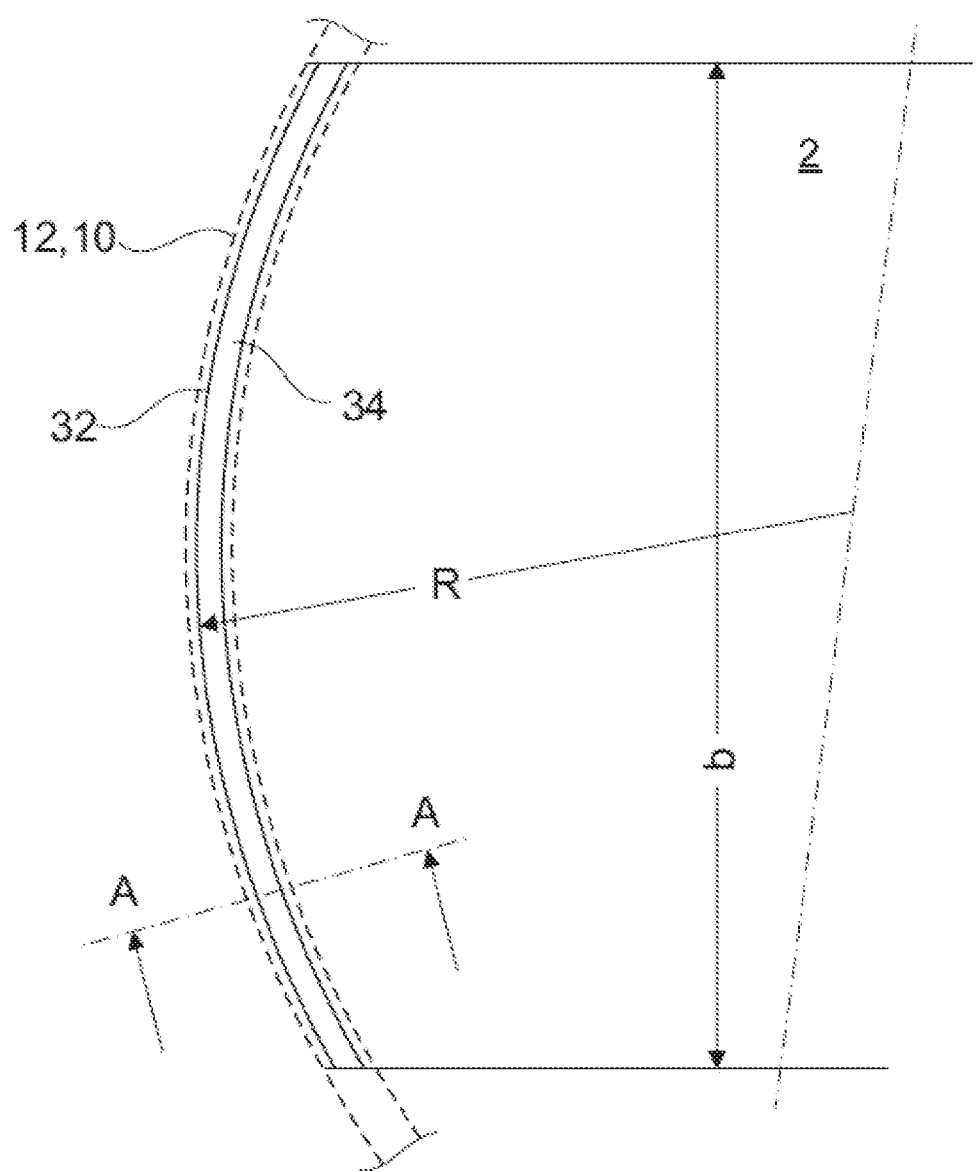
FIG. 2 a bag detached from a film tube by means of said sealing and cutting unit.

FIG. 2 shows the basic structure of the bag 2 that may be produced with a device 1 according to FIG. 1. Accordingly, this bag 2 has a cutting edge 32 having the shape of a circular arc. The entry opening of the bag 2 (not illustrated in FIG. 2) is then formed during the cutting of the following bag 2 and correspondingly also has a radius of curvature R, wherein this open edge is not curved in a convex manner to the outside like the cutting edge 32, but in a concave manner.

As indicated in dashes in FIG. 2, the sealing device 12 and the cutting device 10 are designed with a corresponding radius of curvature R, wherein the total breadth of the cutting device 10 and of the sealing device 12 may, however, be substantially larger than the breadth b of the bag, so that—as explained above—different film tube breadths may be processed. The structures of the cutting device 10 and of the sealing device 12 are explained by means of FIGS. 3 and 4 illustrating a section through these components approximately along the line A-A in FIG. 2, wherein FIG. 3 illustrates the sealing device 12 in the waiting or rest position, and FIG. 4 in the lowered position.

Figure 3:
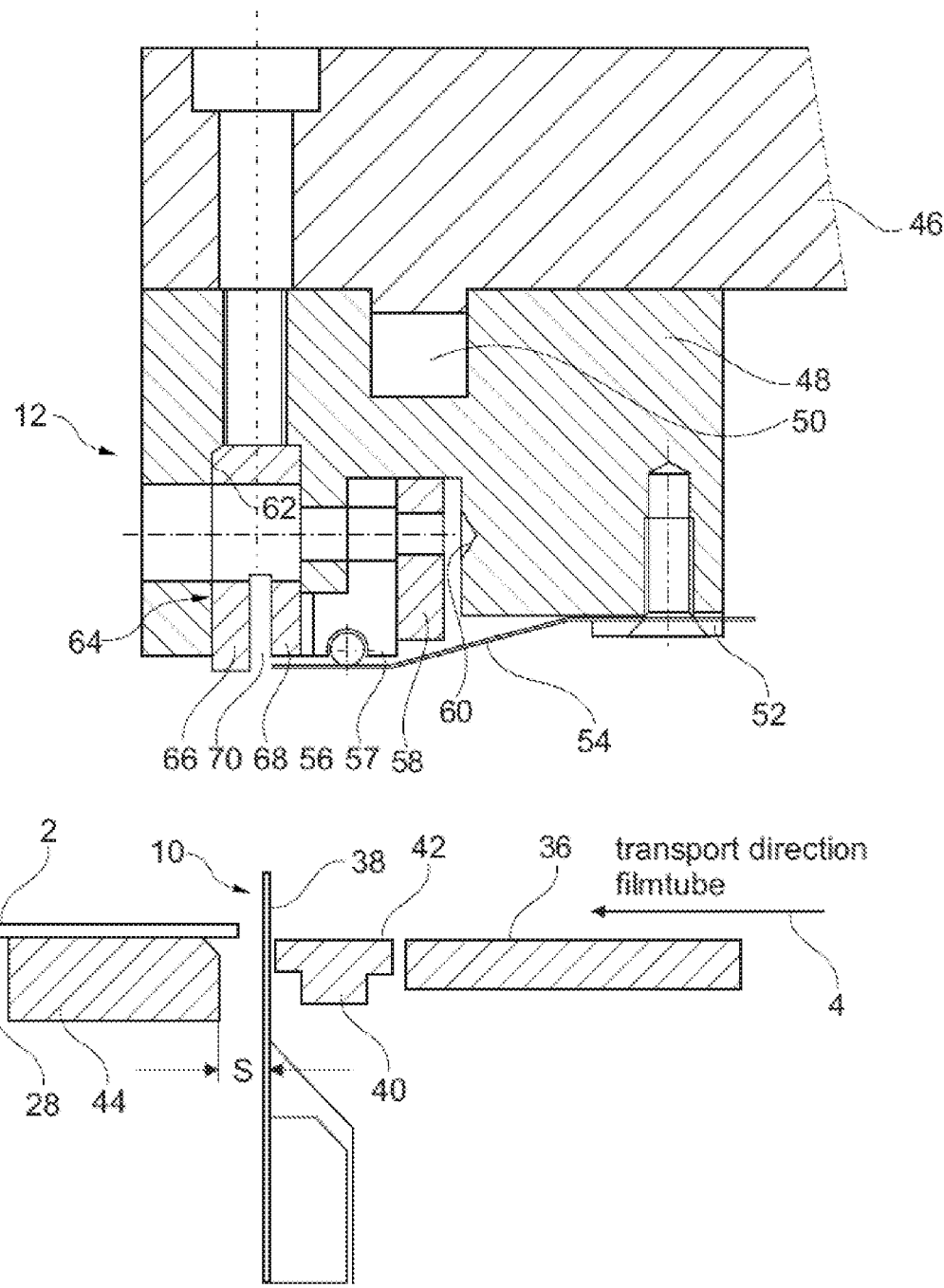
FIG. 3 a cut partial view of the unit of FIG. 1.
Figure 4:
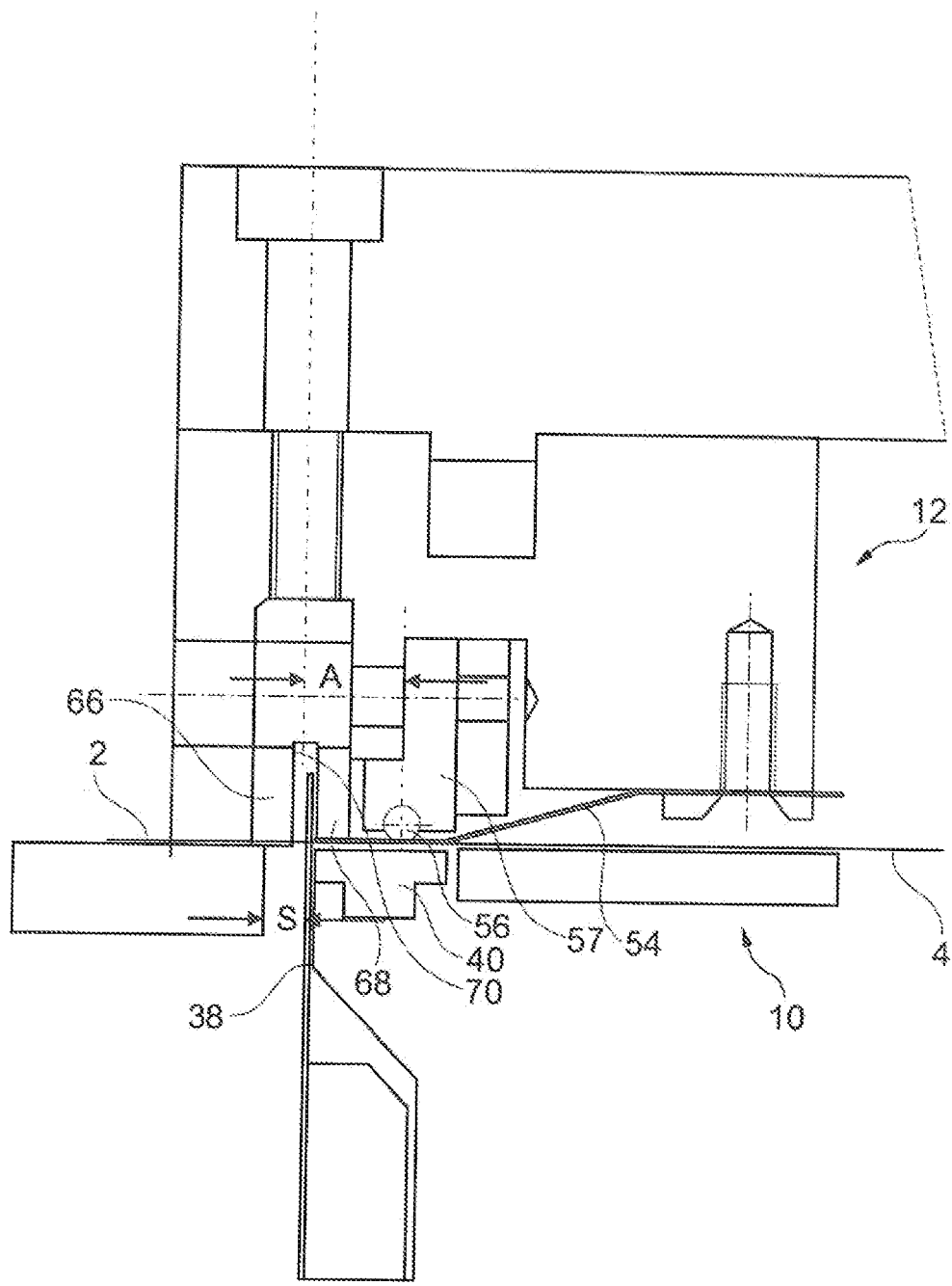
FIG. 4 a cut partial view of the region of FIG. 3 during the detachment of a bag.

Accordingly, in the illustration pursuant to FIG. 3 the sealing device 12 is shown in the position lifted off the film tube 4, i.e. the pneumatic cylinder 14 or, more exactly, the piston rod thereof, is retracted. The film tube 4 moves along a support 36 beyond the cutting device 10, which is, in the illustrated embodiment, formed by a vertical knife 38 extending beyond the transport plane in the direction to the cutter bar 64. In the area between the support 36 and the knife 38, a guide piece 40 of silicone or the like is formed, which is covered by a Teflon format 42. Such a Teflon format is a comparatively thin, film-like element preventing a direct contact of the film tube 4 with the guide piece 40 and avoiding undesired adhering of the film in the resting area.

At a distance s downstream of the knife 38 in the direction of transport, a removal table 44 starts, in which the initially described bores 28 for sucking the film tube end portion or the cut bag 4 are designed. The knife 38 is curved with the radius R, wherein the circumferential edges are not shown in the illustration of FIG. 3.

The sealing device 12 is fastened to a sealing rail support 46 that is in turn attached to the piston rod of the pneumatic cylinder 14, so that the stroke of the pneumatic cylinder 14 is transferred to the sealing rail support 46. The latter supports a sealing rail 48 that is connected to the cooling element 30 via one or several cooling channels 50 and is thus cooled. In the sectional view of FIG. 3, a further Teflon format 54 is fixed via a clamping bar 52 at a large area of the sealing rail 48 facing toward the support 36, said further Teflon format 54 covering a sealing wire 56 and hence preventing the direct contact thereof with the film tube 4.

The sealing wire 56 is accommodated with positive locking in a Teflon bed 57. It is held in a recess 60 of the sealing rail 48 via a clamping bracket 58. By means of the clamping bar 52 that consists, for instance, of Teflon, the sealing wire 56 is thermally insulated against the sealing rail 48, so that the introduction of heat into said sealing rail 48 is minimal. The Teflon bed 57 is designed as an angular piece having the shape of a circular arc.

At a distance to the recess 60 accommodating the clamping bracket 58 and the Teflon bed 57, a cutter bar 64 is inserted into a recess 62 of the sealing rail 48 which has also the shape of a circular arc, and is held there via an appropriate clamping. This cutter bar 64 comprises, at the end portion positioned at the bottom in FIG. 3, hold-down means 66 projecting over the seal rail 48, said hold-down means 66 protruding in the vertical direction somewhat further to the film tube 4 than the Teflon format 54 and the sealing wire 56.

Adjacent to the hold-down means 66, a hold-down leg 68 is designed at the cutter bar 64, said hold-down leg 68 ending, in the illustration pursuant to FIG. 3, above the Teflon format 54 and being even covered thereby. A cutting recess 70 that is oriented in the vertical direction with respect to the knife 38, so that the latter immerses into the cutting recess 70 during cutting, remains between the hold-down means 66 and the hold-down leg 68.

By the distance of the cutter bar 64 from the sealing wire 56 and by the cooling of the sealing rail 48 it is guaranteed that the cutter bar 64 that is in direct contact with the film tube 4 remains comparatively cool and that an undesired adhering of the film tube 4 or the detached bag 2 to the cutter bar 64 can be prevented.

FIG. 4 illustrates the unit 1 with the pneumatic cylinder 14 extracted. By this extraction movement, the sealing device 12 is lowered in the direction to the film tube 4. As indicated, it is then deflected via the Teflon format 54 downward to the guide piece 40, wherein the knife 38 immerses into the cutting recess 70. The hold-down means 66 presses, during this lowering movement and during the immersion of the knife 38 into the cutting recess 70, the portion of the film tube 4 which is, in FIG. 4, positioned at the left of the knife 38, downward in the direction of the gap s (see FIG. 3). This means that the section of the film tube 4 which is to be detached is held approximately in the transport plane, so that I cannot be moved into the cutting recess 70 by the knife 38—the bag 2 is detached smoothly, wherein the breadth of the heat-sealed joint 34 and the progress of the cutting edge 32 are predetermined by the distance A between the sealing wire 56 and the knife 38.

In the illustrated embodiment, the knife protrudes upward relatively far (FIG. 3), so that it contacts the film tube 4 before the sealing wire 56.

The cutter bar 64 or the entire sealing bar my be released easily by loosening the screws/clamping for adaptation to different bag geometries or for maintenance purposes. The same applies to the sealing wire 56 that is held in the Teflon bed 57 and is adapted to be withdrawn to the bottom and be exchanged jointly with the Teflon bed 57.

The device according to the invention is characterized by an extremely compact structure, wherein the introduction of thermal energy is only restricted to the sealing area while the actual cutting area is kept comparatively cool. The easy maintainability of this compact cutting head is to be emphasized, since the sensitive effective elements, i.e. the cutter bar 64, the sealing wire 56, and also the knife 38 are exchangeable in the most easy manner.

Disclosed is a sealing and cutting unit with a sealing device and a cutting device. The latter is assigned with hold-down means positioned downstream of the cutting device in the direction of transport of a film to be sealed and to be detached.

The invention claimed is:

1. A cutting and sealing unit with a sealing device for sealing an edge portion of a film tube or the like, and with a cutting device for detaching a bag or the like along the edge portion, and with a drive for lowering the sealing device or the cutting device, with a cutter bar comprising hold-down means positioned downstream of the cutting device in the direction of transport of the film tube along a transport plane and holding the film in the area of the transport plane thereof in the cutting position, wherein the cutter bar has a cutting recess into which the cutting device immerses in sections through the transport plane during cutting, and which is positioned between the hold-down means and a hold-down leg, characterized in that the hold-down means and hold-down leg extend to different orthogonal positions relative to the transport plane when in the cutting position and wherein the effective surface of the hold down leg is somewhat spaced apart from the transport plane in the cutting position.

2. The unit according to claim 1, wherein the cutting device comprises a vertical knife.

3. The unit according to claim 1, wherein respective Teflon formats are provided at the side of the transport path and at the side of the cutting device in the region of the sealing rail, between which a film tube section extends.

4. The unit according to claim 3, wherein a Teflon format extends up to a cutting recess.

5. The unit according to claim 1, wherein the sealing rail is cooled.

6. The unit according to claim 1, wherein the cutter bar is fastened to the sealing rail.

7. The unit according to claim 1, comprising a control unit for predetermining the bag length.

8. The unit according to claim 1, wherein the sealing device and the cutting device have the shape of a circular arc.

9. The unit according to claim 1, wherein the film tube is pulled off a core.

10. The unit according to claim 1, wherein the cutting device gets into effective engagement with the film upstream of a sealing element.

11. The unit according to claim 1, wherein a Teflon format extends up to the cutting recess.

12. A cutting and sealing unit with a sealing device for sealing an edge portion of a film tube or the like, and with a cutting device for detaching a bag or the like along the edge portion, and with a drive for lowering the sealing device or the cutting device, characterized by a cutter bar comprising hold-down means positioned downstream of the cutting device in the direction of transport of the film tube along a transport plane and holding the film in the area of the transport plane thereof in the cutting position, wherein the hold-down means goes through the transport plane when the apparatus is in the cutting position and pushes the film into a gap to hold the film in the gap when in the cutting position, and wherein the sealing device comprises a sealing rail at which the cutter bar and a sealing element for sealing the film tube are held, and wherein the cutter bar and the sealing device are arcuate.

13. A cutting and sealing unit with a sealing device for sealing an edge portion of a film tube or the like, and with a cutting device for detaching a bag or the like along the edge portion, and with a drive for lowering the sealing device or the cutting device, with a cutter bar comprising a hold-down means positioned downstream of the cutting device in the direction of transport of the film tube along a transport plane and holding the film in the area of the transport plane thereof in the cutting position, wherein the cutter bar has a cutting recess into which the cutting device immerses in sections through the transport plane during cutting, and which is positioned between the hold-down means and a hold-down leg, characterized in that the effective surface of the hold-down leg is somewhat spaced apart from the transport plane in the cutting position, hold-down means and hold-down leg extend to different positions orthogonally relative to the transport plane, wherein during cutting the hold-down means goes through the transport plane and pushes the film into a gap, and wherein and downstream of the cutting device the film is held in the gap from above by the hold-down means.

14. The unit according to claim 1, wherein the sealing device comprises a sealing rail at which the cutter bar and a sealing element for sealing the film tube are held and wherein the sealing element is held at a plastic bed.

* * * * *